United States Patent [19]

Chu et al.

[11] 4,446,258

[45] May 1, 1984

[54] AQUEOUS COATING COMPRISING DISPERSIBLE EPOXY RESIN-ACID POLYMER ESTER AND DILUENT POLYMER, AND METHOD OF PREPARATION

[75] Inventors: Shaw C. Chu, Belle Mead; Arthur T. Spencer, New Providence, both of N.J.

[73] Assignee: Mobil Oil Corporation, New York, N.Y.

[21] Appl. No.: 454,818

[22] Filed: Dec. 30, 1982

[51] Int. Cl.$^3$ .............................................. C09D 3/58
[52] U.S. Cl. .................................. 523/406; 523/100; 523/407; 523/408; 523/409; 523/412; 523/423; 525/63; 525/65; 525/107; 525/108; 525/112
[58] Field of Search ............... 523/100, 406, 407, 408, 523/409, 412, 423; 525/63, 65, 107, 108, 112

[56] References Cited

U.S. PATENT DOCUMENTS

| | | | |
|---|---|---|---|
| 2,954,358 | 9/1960 | Hurwitz | 523/409 |
| 4,029,620 | 6/1977 | Chen | 523/409 |
| 4,212,781 | 7/1980 | Evans et al. | 523/404 |
| 4,247,439 | 1/1981 | Matthews et al. | 523/409 |
| 4,285,847 | 8/1981 | Ting | 525/63 |
| 4,302,373 | 11/1981 | Steinmetz | 523/409 |
| 4,308,185 | 12/1981 | Evans et al. | 525/63 |
| 4,341,682 | 7/1982 | Tobias | 523/409 |
| 4,374,875 | 2/1983 | Fan | 523/423 |
| 4,383,059 | 5/1983 | Brook et al. | 525/107 |
| 4,399,241 | 8/1983 | Ting et al. | 523/400 |

FOREIGN PATENT DOCUMENTS

| | | |
|---|---|---|
| 6334 | 11/1979 | European Pat. Off. . |
| 6336 | 11/1979 | European Pat. Off. . |

*Primary Examiner*—Ronald W. Griffin
*Attorney, Agent, or Firm*—Alexander J. McKillop; Michael G. Gilman; Edward J. Trojnar

[57] ABSTRACT

Aqueous compositions suitable for sanitary can coatings comprising the neutralized water dispersible ionic polymer product of the reaction of an epoxy resin with acid polymer, and a different resin which is not necessarily self-dispersible in water, as well as several methods of preparing such compositions, are disclosed. The second resin which is not necessarily self-dispersible in water is introduced either preformed at any stage or is prepared, in situ, in the presence of the epoxy resin esterified with acid polymer either before the ionic epoxy resin-acid polymer product is dispersed in water. The epoxy resin-acid polymer product acts as a polymeric surfactant capable of keeping even a normally non self-dispersible second polymer in stable dispersion in water.

33 Claims, No Drawings ns having useful viscosity. These
and other advantages will be apparent from the following disclosure.

AQUEOUS COATING COMPRISING DISPERSIBLE EPOXY RESIN-ACID POLYMER ESTER AND DILUENT POLYMER, AND METHOD OF PREPARATION

CROSS REFERENCE TO RELATED APPLICATIONS

An essential component of the composition of this invention is an ionic polymer which is the reaction product of an epoxy resin containing 1,2-epoxy groups, and acid containing polymer. Suitable ionic polymers are disclosed in the following applications which are incorporated herein by reference in entirety: U.S. Application Ser. No. 249,795, filed Apr. 1, 1981; U.S. Application Ser. No. 221,641, filed Dec. 31, 1980; and U.S. Application Ser. No. 378,314, filed May 14, 1982. Disclosure of ionic polymers also appears in published European application Nos. 6334 and 6336 both published Jan. 9, 1980. European application No. 6336 and aforementioned Ser. No. 249,795 are based on the same U.S. priority application Ser. No. 914,472 filed June 12, 1978). European application No. 6334 and aforementioned applications, Ser. No. 221,641 and 378,314, are based on the same U.S. priority application Ser. No. 914,471, filed June 12, 1978.)

A concurrently filed application by the same inventors named herein Ser. No. 454,771, filed Dec. 30, 1982 entitled "AQUEOUS COATINGS COMPRISING IONIC POLYMER AND DILUENT POLYMER WITH REDUCED MONOMER RESIDUE, AND METHOD OF PREPARATION" constitutes an improvement over the compositions of this invention.

BACKGROUND OF THE INVENTION

A variety of aqueous coating compositions comprising epoxy resin and acrylic polymer are known in the art and several are commercially available. In order to obtain desirable characteristics for many critical end use applications, such as coatings for sanitary cans, it is considered necessary to include a high proportion of epoxy resin in the composition. Epoxy contents of 60 to 80 percent are commonly used. Typical epoxy acrylate compositions are disclosed in U.S. Pat. No. 4,247,439 to Matthews and Sommerfield; U.S. Pat. Nos. 4,212,781 and 4,308,185 to Evans and Ting; and U.S. Pat. No. 4,302,373 to Steinmetz; all of which are incorporated herein by reference.

U.S. Pat. No. 4,285,847 to Ting discloses epoxy acrylic compositions in which the epoxy acrylic is made by free-radical grafting of ionizable side chains onto an epoxy backbone; dispersing this product in water and thereafter polymerizing, in situ, addition polymerizable monomers which may or may not also contain ionizable groups. By this means the solids content of the composition is increased and the proportion of total epoxy resin in the composition is reduced by replacement with the cheaper addition polymer thereby reducing the cost of the composition.

In accordance with the present invention cost reduction as well as several other advantages over U.S. Pat. No. 4,285,847 are obtained. By using an epoxy acrylate prepared by an esterification reaction between epoxy resin and acrylic polymer instead of the graft epoxy-acrylic of U.S. Pat. No. 4,285,847, benefits are obtained in the latitude of solids and viscosity which can be conveniently obtained, and in the ability to reduce the amount of amine neutralizing agent necessary to obtain stable water dispersions having useful viscosity. These and other advantages will be apparent from the following disclosure.

BRIEF DESCRIPTION OF THE INVENTION

The present invention relates to aqueous coating compositions comprising the neutralized water-dispersible product containing ester groups which is the reaction product of an epoxy resin and an acid polymer, and a different polymer which is not necessarily self-dispersible in water. The epoxy resin-acid polymer product acts as a polymeric surfactant capable of keeping even a normally non self-dispersible second polymer in stable dispersion in water. The second polymer serves as a polymeric diluent which permits a reduction in the proportion of epoxy used and may result in a less expensive product.

The compositions of this invention are made by any of several convenient methods. Preferably, the ionic epoxy resin-acid polymer product is prepared and dispersed in water with ammonia or amine and a second different polymer is produced, in situ, by polymerization in the presence of the epoxy resin-acid polymer product which acts as a polymeric surfactant. Alternatively, the second polymer can be preformed and added to the aqueous dispersion of the epoxy resin-acid polymer. Also, the combination of the acid polymer and the second different polymer which is not necessarily self-dispersible in water can be made prior to the reaction of the acid polymer with the epoxy resin.

DETAILED DESCRIPTION OF THE INVENTION

The compositions of this invention comprise two essential components, an ionic polymer component which contains sufficient carboxyl groups to render it self-dispersible in water in neutralized form which is the reaction product of an epoxy resin containing 1,2-epoxy groups with a preformed addition polymer containing carboxyl groups; and an addition polymer which is different from the addition polymer reacted with the epoxy resin to form the ionic polymer component. The entire composition is neutralized with ammonia or an organic amine in an amount sufficient to render the composition stably dispersible in water.

The ionic polymer component can be prepared by the methods disclosed in the copending applications cross referenced and incorporated by reference above or they can be prepared in accordance with the procedures described in U.S. Pat. No. 4,247,439 to Matthews and Sommerfield or U.S. Pat. No. 4,302,373 to Steinmetz both of which are also incorporated by reference. Briefly, the methods disclosed in the copending applications and the issued patents involve the reaction of an epoxy resin containing 1,2-epoxy groups with a preformed addition polymer containing carboxyl groups in the presence of a tertiary amine. In the copending applications the conditions are chosen so that an esterification reaction occurs between the epoxy groups of the epoxy resin and the carboxyl groups of the addition polymer. Reaction conditions in the aforementioned patents are selected in order to promote a reaction between the tertiary amine and epoxy groups giving quaternary ammonium groups in accordance with a well known reaction. It is believed that the reaction which is intended to promote esterification also results in the formation of quaternary ammonium groups by reaction between the epoxy groups and the tertiary amine. Also, the reaction described in the issued patents intended to produce quaternary ammonium groups can, under appropriate conditions, result in ester formation. The ionic polymers suitable for practicing the present invention therefore can contain quaternary groups, providing that hydroxy ester groups obtained by the reaction of epoxy groups with carboxyl groups are also present. At a minimum at least about 5 percent of the epoxy groups on the epoxy resin should be converted to hydroxy ester groups. Whatever the relative proportions of quaternary and hydroxy ester groups are the ionic polymer is reacted so that the ionic polymer is substantially free of unreacted 1,2-epoxy groups.

The ionic polymer may contain carboxyl polymer grafted to carbon atoms on the epoxy resin backbone but it is preferred that the ionic polymer is prepared under conditions in which grafting is avoided.

In general, the epoxy resin constitutes at least about 40 percent of the ionic polymer and the carboxyl containing polymer comprises the balance. Preferably the epoxy content is at least 60 percent and most preferably about 75 percent.

The present invention is operable with a variety of epoxy resins. However, the epoxy resins which are preferred are aromatic polyethers, particularly those derived from the condensation of a bisphenol such as Bisphenol A, and epichlorohydrin. These epoxy resins possess hydroxy groups in addition to epoxy groups. The higher the molecular weight of the epoxy resin the more hydroxy groups are present. These hydroxy groups can participate in the final curing reaction. The preferred epoxy resins are aromatic polyethers having a number average molecular weight ($M_n$) of at least about 1,500. However, the number average molecular weight of these resins can vary from about 350 to 6000.

As recognized in the art, epoxy resins prepared by the condensation of bisphenols and epichlorohydrin contain a mixture of diepoxides, monoepoxides and aromatic polyethers which are free of epoxy groups. The average functionality of such mixtures may range widely from about 0.2 epoxy groups per molecule to nearly 2 epoxy groups per molecule. Suitable mixtures of epoxy resins can be obtained by reacting a lower molecular weight epoxy resin having a functionality of between 1 and 2, for example, with a defunctionalizing agent which is capable of reacting with the epoxy groups. The defunctionalizing agent can contain carboxyl groups, hydroxy groups or amide groups, for example. Specific suitable materials include acids such as benzoic acid and fatty acids such as octanoic acid; hydroxy compounds such as phenols, in particular bisphenols and lower alkanols; and amides such as acrylamide. Defunctionalization with bisphenols is of particular interest since the epoxy resin is thereby upgraded to higher molecular weight at the same time as some of the epoxy groups are defunctionalized.

The carboxyl polymer is prepared by the addition polymerization of ethylenically unsaturated monomers comprising at least about 20 percent of an ethylenically unsaturated carboxylic acid based on the total weight of the monomers. Polymers and copolymers of this type are well known although the copolymers with particularly high proportions of carboxylic acid as preferred herein are somewhat unusual. Preferably the carboxyl containing polymer is a copolymer with ethylenically unsaturated monomers which are non-reactive under the contemplated conditions of polymerization and reaction with epoxy resin. However, small amounts of reactive monomers, e.g., hydroxy monomers such as 2-hydroxy ethylmethacrylate, amide monomers such as acrylamide, and N-methylol monomers such as N-methylol acrylamide, can be used. Suitable non-reactive monomers are, for example, acrylate and methacrylate esters such as ethyl acrylate, methyl acrylate, butyl acrylate, styrene or vinyl toluene, vinyl acetate, vinyl chloride, vinylidine chloride, acrylonitrile, and the like. The function of these monomers is to enhance solvent solubility and to provide good film formation. Otherwise the nature and proportions are not critical to this invention.

The presence of a large proportion of carboxyl functional monomer is essential. The preferred minimum proportion of carboxyl monomer is 30 percent of the weight of the monomers used to prepare the carboxyl containing polymer. Methacrylic acid provides the best hydrolytic stability and is very much preferred, but other acids such as fumaric acid, acrylic acid, crotonic acid and itaconic acid and the like are useful. Up to about 80 percent of the monomers can be carboxyl functional, the maximum being determined by retention of solvent solubility of the copolymer.

The preferred polymers containing carboxyl groups generally having number average molecular weight ($M_n$) in the range of 3000 to 20,000, preferably 3,000 to 6,000. Molecular weight can be controlled by monomer content during polymerization, catalyst concentration and polymerization temperature in the known manner. Mercaptan chain termination is preferably avoided especially where the product is intended for use in coating of sanitary cans because of the offensive odor of mercaptans.

Generally, the addition polymer containing carboxyl groups is preformed and is reacted with the epoxy resin as a solvent solution in the presence of sufficient amine, preferably tertiary amine to promote the reaction. However, the addition copolymer can also be prepared by reacting a carboxyl containing monomer such as methacrylic acid with the epoxy group in the presence of tertiary amine and subsequently polymerizing additional monomers, in situ. The reaction between the oxirane groups of the epoxy resin and the carboxyl groups of the addition polymer is carried out in the presence of an esterification catalyst.

The preferred esterification catalysts are tertiary amines particularly, dimethylaminoethanol but other esterification catalysts particularly tertiary amines such as dimethylbenzylamine, trimethylamine, and tributylamine can be used. The amount of catalyst used can vary widely. For example, where a tertiary amine is used as little as 0.1–0.3 percent by weight of the catalyst based on the total amount of epoxy resin and carboxyl containing polymer can be used or the amount can be much larger up to about 10 percent and more of the reactants.

Another way of defining the amount of amine used is the relation to the total carboxyl content of the acid polymer. The amount of amine present during the reaction of the epoxy resin and carboxyl polymer will be sufficient to neutralize from about 5 to about 50 percent of the carboxyl groups in the acid polymer. Preferably, the amine is sufficient to neutralize between about 10 and about 35 percent of the carboxyl groups. Still another way of defining the amount of tertiary amine present during reaction of the epoxy resin and carboxyl polymer is by the equivalent ratio of amine to 1,2-epoxy groups. Preferably, this ratio is less than one thereby ensuring that some of the epoxy groups will be consumed in hydroxy ester formation by reaction with carboxyl group.

The amount of amine has a significant effect on the nature of the product of the reaction. In general, the smaller the amount of amine present during reaction the higher the viscosity of the product. This difference in viscosity is apparent in both the solvent solution and when the product is emulsified in water. The effect of the amount of amine used is observed even where the total amount of amine present in the dispersed product is identical. Thus, for example, the same product is not obtained when amine is present at the 40 percent neutralization level during reaction as when amine sufficient to neutralize 5 percent of the carboxyl groups is present during reaction and supplemented with 35 percent of the neutralization amount prior to dispersion in water.

The amount of amine present during reaction also has a pronounced effect on the particle size of the final dispersion. The relationship of amine content to particle size is illustrated in the following examples.

The second polymer different from the addition polymer used to prepare the ionic epoxy resin-acid polymer product can be prepared from a wide variety of unsaturated monomers. Particularly preferred are monomers which are free of functional groups reactive with epoxy resin or which would render the polymer self-dispersible in water. For example there may be mentioned the esters of acrylic and methacrylic acid such as methyl acrylate, butyl acrylate, methyl methacrylate and butyl methacrylate; aromatic monomers such as styrene and methylstyrene; vinyl and vinylidene halides such as vinyl chloride and vinylidene chloride; isoprene; butadiene; acrylonitrile; and the like. In certain applications it may be advantageous to include in the copolymer self-crosslinking monomers such as N-methylol acrylamide or N-isobutoxy acrylamide. Presently preferred monomers include styrene, methylstyrene and butyl acrylate and acrylonitrile.

The second polymer can be introduced at any convenient stage of the reaction. Preferably, the second polymer is prepared, in situ, in the presence of an aqueous dispersion of the ionic epoxy-acidic polymer reaction product. The reaction is conducted in the known manner. Advantageously, the reaction is initiated by a redox system. Inorganic or organic peroxide such as hydrogen peroxide or t-butyl hydroperoxide; or persulfates such as ammonium persulfate and alkali metal persulfates can be coupled with a suitable reducing agent such as hydrazine, ammonium or alkali metal sulfites, bisulfites, metabisulfites or hydrosulfites. The procedures disclosed in U.S. Pat. No. 4,285,847 which is incorporated by reference herein are suitable for conducting the polymerization.

The second polymer can also be introduced as a preformed polymer into either the aqueous dispersion of the ionic epoxy-acid polymer product or can be mixed with the ionic epoxy resin-acid polymer product before it is dispersed in water. Similarly, the second polymer can be mixed with a solvent solution of the acidic polymer prior to its reaction with the epoxy resin either by making the addition polymers separately or by preparing one in the presence of the other. The proportion of the second polymer in the composition can vary widely. The maximum is limited by the amount which can be stably dispersed in water by the ionic polymer component and the retention of desired film properties. Usually the weight ratio of the second addition polymer (B) to the ionic polymer (A) is from 0.05:1 to 10:1 but more preferably is 0.2:1 to 5:1.

The resins used in preparing the compositions of this invention are used by dissolution in a volatile organic solvent. A wide variety of solvents are suitable. Organic solvents of limited water miscibility, such as xylene, toluene, butanol and 2-butoxyethanol are useful, and they may be used alone or together with water miscible solvents, such as 2-ethoxyethanol or methyl ethyl ketone.

The final composition includes sufficient ammonia or amine to render the mixture self-dispersible in water. Preferably, a tertiary amine such as dimethylethanolamine is used. In general, the total amount of an amine or an ammonia present in the final product will be sufficient to neutralize at least about 25 to about 90 percent of the carboxyl groups present in the polymers used to prepare their composition. Finally, compositions, as used, preferably include a curing agent such as an aminoplast or a phenoplast resin in an amount of 1 to 25 percent, preferably from 3 to 10 percent, based on the solids of the composition.

This invention is illustrated by the following non-limiting examples.

EXAMPLE 1

A polymer surfactant dispersion is prepared by reacting an acid containing acrylic prepolymer with an epoxy resin, neutralizing with these and dispersing in water.

The acrylic prepolymer is prepared as follows:

|  | Parts by Weight |
|---|---|
| Butanol | 2755.2 |
| Methacrylic Acid | 1197.7 |
| Styrene | 597.8 |
| Ethyl Acrylate | 197.5 |
| Benzoyl Peroxide (70%, Water Wet) | 142.8 |
| 2-Butoxyethanol | 1995.8 |
|  | 6886.8 |

The butanol is charged to a 12-liter reactor equipped with a stirrer, reflux condenser, thermometer, addition funnel and nitrogen inlet. A premix is made of the monomers and benzoyl peroxide and 20 percent is added to the reactor. The nitrogen flow is started and the reactor is heated to 93° C. and held at this temperature for 15 minutes. The remaining premix is added uniformly over 5 hours while maintaining 93° C. After the premix is added, the temperature is held for two hours to complete the polymerization. The 2-butoxyethanol is then added to dilute the prepolymer. The resulting solution has a solids content of 30.3 percent, an acid number of 385 and a viscosity of 2600 centipoise.

An epoxy acrylate adduct is formed by esterifying an epoxy resin with the above acrylic prepolymer under amine catalysis as follows:

|  | Parts by Weight |
|---|---|
| DER 331[1] | 698.1 |
| Bisphenol A | 374.9 |
| 2-Butoxyethanol | 116.8 |
| Tri-n-butylamine | 2.2 |
| Acrylic Prepolymer | 1299.0 |
| Dimethylaminoethanol | 28.6 |

| | Parts by Weight |
|---|---|
| Dimethylaminoethanol | 40.4 |
| Cymel 1156[2] | 107.7 |
| Deionized Water | 2331.5 |
| | 4999.2 |

[1]DER-331 (Dow Chemical Co.) - A 182-190 epoxy equivalent weight diglycidyl ether of bisphenol A.
[2]Cymel 1156 (American Cyanamid Co.) - A butylated melamine curing agent.

The first four items above are charged to a 5-liter reactor with stirrer, reflux condenser, thermometer and nitrogen inlet. Nitrogen flow is started and the reactants are heated to 130° C. After exotherm, 150° C. is maintained until the oxirane content of the reaction mixture falls to 0.37 meq/g. The acrylic prepolymer is then added. The mixture is stirred until uniform and the temperature is adjusted to 94° C. The first amount of dimethylaminoethanol (esterification catalyst) is then added and this temperature is held for 3 hours. The reaction mixture turns from opaque to translucent and the acid number drops by the amount indicating complete reaction of the epoxy. The epoxy acrylate resin solution has a solids content of 57.3, an acid number of 85.0 and a specific viscosity of 0.33. There is no residual oxirane content.

To form a dispersion, the epoxy acrylate adduct is further neutralized with the second portion of dimethylaminoethanol and the curing agent is added. Water is added with efficient stirring to produce a stable small particle size dispersion with a solids content of 31.5 percent.

EXAMPLE 2

The above polymeric surfactant dispersion (2,000 parts) is transferred to a 5 liter reactor together with 500 parts of deionized water and 30 parts of dimethylaminoethanol. A nitrogen blanket is applied and the reactor is heated to 80° C. A mixture of 303 parts of styrene and 17 parts of benzoyl peroxide (70%, water wet) is added with stirring over 3 hrs. at 80° C. Then, t-Butyl hydroperoxide (0.5 part) is added. After a 5-minute wait, 0.5 parts of sodium bisulfite in 15 parts water is added over 15 minutes. The emulsion is held at 80° C. for ½ hour. Water (800 parts) is added and the emulsion is cooled. The product has a solids content of 24.1 percent acid number of 62, specific viscosity of 0.76 and dispersion viscosity of 125 cp.

The above emulsion was drawn down on aluminum and tinplate substrates and baked for 2 minutes at 400° F. Properties of gloss, adhesion, wedgebend flexibility and pasteurization resistance were all rated excellent at beer and soft drink weights.

EXAMPLE 3

The polymeric surfactant of Example 1 (2000 parts) is charged to a 5 liter reactor together with 500 parts of deionized water and 5 parts of sodium bisulfite. The mixture is heated to 65° C. under a nitrogen blanket. A premix of 225 parts of styrene, 75 parts of acrylonitrile and 5 parts of t-butyl hydroperoxide (70%) is added over 1 hour at 65° and the mixture then held for an additional ½ hour. An additional 0.5 parts of t-butyl hydroperoxide (70%) is added. After 5 minutes a mixture of 0.5 parts sodium bisulfite in 15 parts water is added. Temperature (65° C.) is held for an additional ½ hour, then a mixture of 800 parts water and 15 parts dimethylaminoethanol are added. The resulting coating emulsion has a solids content of 24.8 percent, an acid number of 59.5 and viscosity of 85 centipoise.

Test results on aluminum and tinplate panels, as in Example 2, all produced excellent results.

EXAMPLE 4

An epoxy acrylate polymeric surfactant dispersion is formed by reacting an epoxy resin with the acrylic prepolymer of Example I under tertiary amine esterification catalysis as follows:

| | Parts by Weight |
|---|---|
| Epon 828[1] | 1445.0 |
| Bisphenol A | 780.2 |
| 2-Butoxyethanol | 245.0 |
| Tri-n-butylamine | 4.6 |
| Acrylic prepolymer of Example I | 2674.0 |
| Deionized Water | 138.9 |
| Dimethylaminoethanol | 89.0 |
| Dimethylaminoethanol | 79.1 |
| Cymel 1156 | 150.2 |
| Deionized Water | 4944.2 |
| | 10550.2 |

[1]Epon 828 (Shell Chemical Co.) - An 182-190 epoxy equivalent weight diglycidyl ether of bisphenol A.

The procedure of the epoxy acrylate preparation and dispersion of Example I are followed with the exception that a minor amount of water is added with the acrylic prepolymer to help control reaction viscosity and temperature. The resulting polymer has an acid number of 85.7. The dispersion product has a solids content of 29.2%, a pH of 6.8, viscosity of 12,600 centipoise and particle size 0.17 microns.

The above polymeric surfactant dispersion (4500 parts) is charged to a 12 l reactor together with 4320 parts of deionized water, 27 parts of dimethylaminoethanol and 21 parts of ammonium bisulfite (45%). The mixture is heated to 65° C. under a nitrogen blanket. A premix of 657 parts of styrene, 657 parts of butyl acrylate and 8.73 parts of t-butyl hydroperoxide (90%) is added over 2 hours at 65° C. and the mixture then held for an additional ½ hour. An additional 0.90 parts of t-butyl hydroperoxide (70%) is added. After 5 minutes a mixture of 1.8 parts ammonium bisulfite and 27 parts of water is added. Temperature (65° C.) is held for an additional ½ hr. The resulting emulsion product has a solids content of 25.5%, a pH of 7.1, an acid number of 51.0 and viscosity (Brookfield) of 1140 centipoise.

Test results on aluminum and tin plate panels, as in Example 2, all produced excellent results.

EXAMPLE 5

The emulsion product of Example 4 (4000 parts) is mixed with 222 parts of butanol, 882 parts of water and 9.43 parts of dimethylaminoethanol until uniform. The resulting finish, which is ready for spray linear application, has a solids content of 19.9%, a pH of 7.4, surface tension of 26.2 dynes/cm and viscosity of 36 sec as measured by #4 Ford Cup.

Test results on spray application using aluminum and tinplate cans produced blister-free interior can coatings with excellent enamel rater coverage. The sprayed coatings also showed excellent adhesion, reverse impact resistance and pasteurization resistance.

EXAMPLES 6-14

A series of compositions were prepared in the manner described in Example 4. The amount of dimethylaminoethanol present during reaction of the epoxy resin and the carboxyl containing acrylic copolymer was varied in increments from 10 percent to 35 percent of the amount necessary to neutralize the carboxyl groups of the acrylic copolymer. Results of reduced specific viscosity, viscosity and particle size were measured at various stages of the process. The results are summarized in Tables I and II. It is evident that the amount of amine present during the reaction between epoxy resin and the carboxyl group containing acrylic copolymer has a profound effect on the viscosity and particle size of the ionic polymer and that this effect is also evident after the styrene-butyl acrylate polymer is introduced.

TABLE I

| EXAMPLE | IONIC RESIN SOLUTION | | | | IONIC RESIN DISPERSION | | | | |
|---|---|---|---|---|---|---|---|---|---|
| | % Cat* DMEOA | % NV | AN | RSV** | % NV | pH | Visc. | % Neut | Part. Size Microns |
| 6 | 10 | 57.5 | 90.8 | 0.39 | 29.2 | 6.8 | 33,750 | 38.3 | 0.23 |
| 7 | 12 | 57.8 | 90.1 | 0.36 | 29.2 | 6.8 | 20,750 | 37.1 | 0.21 |
| 8 | 14 | 58.7 | 88.8 | 0.33 | 29.3 | 6.8 | 10,460 | 37.3 | 0.18 |
| 9 | 16 | 58.3 | 89.0 | 0.32 | 29.2 | 6.6 | 9,340 | 38.4 | 0.17 |
| 10 | 18 | 56.8 | 89.4 | 0.31 | 29.3 | 6.8 | 5,800 | 38.3 | 0.17 |
| 11 | 20 | 57.3 | 89.4 | 0.29 | 29.0 | 6.8 | 3,200 | 38.5 | 0.16 |
| 12 | 25 | 58.5 | 90.4 | 0.26 | 29.8 | 6.7 | 590 | 37.1 | 0.24 |
| 13 | 30 | 57.3 | 88.4 | 0.25 | 29.4 | 6.7 | 366 | 40.3 | 0.27 |
| 14 | 35 | 58.6 | 87.0 | 0.25 | 29.5 | 6.8 | 280 | 41.1 | 0.39 |

*Percent neutralization of acrylic prepolymer.
**Reduced specific viscosity - 1% by weight of dry resin in dimethylformamide at 25° C.

TABLE II

| EXAMPLE | IONIC RESIN DISPERSION | | | | DISPERSION OF IONIC RESIN AND COPOLYMER (24.8 ± .2% solids) | | |
|---|---|---|---|---|---|---|---|
| | % Cat.* DMEOA | RSV** | Visc. (cp) | Part. Size Microns | RSV*** | Visc. (cp) | Part. Size Microns |
| 6 | 10 | 0.39 | 33,750 | 0.23 | 0.81 | 1410 | 0.25 |
| 7 | 12 | 0.36 | 20,750 | 0.21 | 0.63 | 630 | 0.30 |
| 8 | 14 | 0.33 | 10,460 | 0.18 | 0.70 | 500 | 0.28 |
| 9 | 16 | 0.32 | 9,340 | 0.17 | 0.65 | 275 | 0.27 |
| 10 | 18 | 0.31 | 5,800 | 0.17 | 0.68 | 200 | 0.27 |
| 11 | 20 | 0.29 | 3,200 | 0.16 | 0.80 | 110 | 0.27 |
| 12 | 25 | 0.26 | 590 | 0.24 | 0.79 | 31 | 0.31 |
| 13 | 30 | 0.25 | 366 | 0.27 | 0.60 | 21 | 0.39 |
| 14 | 35 | 0.25 | 280 | 0.39 | 0.61 | 16 | 0.57 |

*Percent neutralization of acrylic polymer.
**Reduced specific viscosity - 1% by weight of dry resin in dimethylformamide at 25° C.
***Reduced specific viscosity - 1% by weight of dry resin in tetrahydrofuran at 25° C.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. An aqueous dispersion comprising
   A. an ionic polymer component containing sufficient carboxyl groups to render it self dispersible in water in neutralized form which is the reaction product of an epoxy resin containing 1,2-epoxy groups, and a preformed addition polymer containing carboxyl groups, said ionic polymer containing hydroxy ester groups from the reaction of 1,2-epoxy groups on said epoxy resin with carboxyl groups on said preformed addition polymer, and being substantially free of unreacted 1,2-epoxy groups;
   B. an addition polymer different from said preformed addition polymer defined in (A) and;
   C. ammonia or an organic amine neutralizing agent in an amount sufficient to render the composition stably dispersible in water.

2. The aqueous dispersion of claim 1 in which said addition polymer (B) is not self dispersible in water.

3. The aqueous dispersion of claim 1 in which said ionic polymer component is prepared in the absence of water.

4. The aqueous dispersion of claim 1 in which said ionic polymer component is prepared in the presence of water.

5. The aqueous dispersion of claim 1 in which said 1,2-epoxy resin is an aromatic epoxide resin having an average epoxy functionality of greater than 1.

6. The aqueous dispersion of claim 1 in which said addition polymer B is prepared in the presence of an aqueous dispersion of said ionic prepolymer.

7. The aqueous dispersion of claim 1 in which said addition polymer (B) is prepared, in situ, in the presence of said preformed addition polymer containing carboxyl groups prior to its reaction with said epoxy resin.

8. The aqueous dispersion of claim 1 in which said addition polymer (B) is prepared, in situ, in the presence of said ionic polymer component (A).

9. The aqueous dispersion of claim 1 in which said addition polymer (B) is prepared, in situ, in the presence of an aqueous dispersion of said ionic polymer component (A).

10. The aqueous dispersion of claim 1 in which said ionic polymer component (A) is prepared in the presence of a tertiary amine.

11. The aqueous dispersion of claim 1 in which said ionic polymer component is prepared in the presence of a tertiary amine and additional tertiary amine is used as the neutralizing agent (C).

12. The aqueous dispersion of claim 10 in which said tertiary amine is dimethylaminoethanol.

13. The aqueous dispersion of claim 1 in which said preformed addition polymer containing carboxyl groups is a copolymer of methacrylic acid.

14. The aqueous dispersion of claim 12 in which said preformed addition polymer containing carboxyl groups is a copolymer of methacrylic acid, ethyl acrylate and styrene.

15. The aqueous dispersion of claim 1 in which said 1,2-epoxy resin is an epichlorohydrin-bisphenol A epoxy resin.

16. The aqueous dispersion of claim 1 in which said addition polymer (B) is a copolymer of styrene and butyl acrylate.

17. The aqueous dispersion of claim 1 in which said ionic polymer component (A) is the reaction product of epichlorohydrin-bisphenol A epoxy resin, an addition copolymer of methacrylic acid, ethyl acrylate and styrene, and dimethylaminoethanol; said addition polymer (B) is the copolymer of styrene and butyl acrylate; and the neutralizing agent (C) is dimethylaminoethanol in an additional amount than used to prepare (A).

18. The aqueous dispersion of claim 17 in which said addition polymer (B) is prepared, in situ, in the presence of an aqueous dispersion of (A).

19. The aqueous dispersion of claim 17 which contains, in addition, a phenoplast or aminoplast curing agent.

20. A method for preparing an aqueous dispersion comprising preparing a mixture of an addition polymer containing carboxyl groups which is self dispersible in water in neutralized form and a different addition polymer; and reacting said mixture with an epoxy resin containing 1,2-epoxy groups to prepare a product which is substantially free of unreacted 1,2-epoxy groups which contain hydroxy ester groups from the reaction of 1,2-epoxy groups with the carboxyl groups on said addition polymer and which is self-dispersible in water; and dispersing the product so obtained in water with the addition of ammonia or an organic amine neutralizing agent in an amount sufficient to render the composition stably dispersible in water.

21. The method of claim 20 in which said different polymer is not self dispersible in water.

22. A method for preparing an aqueous dispersion comprising the steps of

A. preparing a solvent solution of an ionic polymer component containing sufficient carboxyl groups to render it self dispersible in water in neutralized form by reacting an epoxy resin containing 1,2-epoxy groups, and a preformed addition polymer containing carboxyl groups, said ionic polymer containing hydroxy ester groups from the reaction of 1,2-epoxy groups on said epoxy resin with carboxyl groups on said preformed addition polymer, and being substantially free of unreacted 1,2-epoxy groups;

B. adding to said solvent solution of the ionic polymer component, an addition polymer different from said preformed addition polymer defined in (A); and C. dispersing the mixture so obtained with the addition of ammonia or an organic amine neutralizing agent in an amount sufficient to render the composition stably dispersible in water.

23. The method of claim 22 in which said different addition polymer in (B) is not self-dispersible in water.

24. A method for preparing an aqueous dispersion comprising the steps of

A. preparing an ionic polymer component containing sufficient carboxyl groups to render it self dispersible in water in neutralized form by reacting an epoxy resin containing 1,2-epoxy groups, and a preformed addition polymer containing carboxyl groups, said ionic polymer containing hydroxy ester groups from the reaction of 1,2-epoxy groups on said epoxy resin with carboxyl groups on said preformed addition polymer, and being substantially free of unreacted 1,2-epoxy groups;

B. dispersing said ionic polymer component in water with the addition of ammonia or an organic amine neutralizing agent in an amount sufficient to render the composition stably dispersible in water; and C. incorporating an addition polymer different from said preformed addition polymer defined in (A) into the aqueous dispersion of said ionic polymer component.

25. The method of claim 24 in which the addition polymer added in step (C) is formed by in situ polymerization in the presence of an aqueous dispersion of said ionic polymer component.

26. The method of claim 24 in which the addition polymer added in step (C) is a preformed polymer.

27. The method of claim 24 in which said different addition polymer in step (C) is not self-dispersible in water.

28. The method of claim 25 in which said different addition polymer in step (C) is not self-dispersible in water.

29. The method of claim 26 in which said different addition polymer in step (C) is not self-dispersible in water.

30. The aqueous dispersion of claim 10 in which said tertiary amine is present in an amount sufficient to neutralize 10 to 35 percent of the carboxyl groups on said preformed addition polymer.

31. The method of claim 20 in which said ionic polymer component is prepared in the presence of a tertiary amine in an amount sufficient to react with 10 to 35 percent of the carboxyl groups on said preformed addition polymer.

32. The method of claim 22 in which said ionic polymer component is prepared in the presence of a tertiary amine in an amount sufficient to react with 10 to 35 percent of the carboxyl groups on said preformed addition polymer.

33. The method of claim 24 in which said ionic polymer component is prepared in the presence of a tertiary amine in an amount sufficient to react with 10 to 35 percent of the carboxyl groups on said preformed addition polymer.

* * * * *